UNITED STATES PATENT OFFICE.

WILLIAM H. MAHLER, OF NEWARK, NEW JERSEY.

METHOD OF DERIVING HYDRAZOBENZOL AND ITS HOMOLOGUES.

1,405,732. Specification of Letters Patent. Patented Feb. 7, 1922.

No Drawing. Application filed May 25, 1918. Serial No. 236,511.

*To all whom it may concern:*

Be it known that I, WILLIAM H. MAHLER, a citizen of the United States of America, residing at Newark, county of Essex, State of New Jersey, have invented certain new and useful Improvements in Methods of Deriving Hydrazobenzol and Its Homologues, of which the following is a specification.

The invention relates to a method of deriving hydrazobenzol, hydrazotoluol and other homologues.

More particularly, the invention relates to the method of deriving hydrazobenzol, hydrazotoluol and other homologues by the hydrogenation or reduction of nitrobenzol or corresponding homologue by the use of zinc in particle form, such as zinc flakes, granules or feathers. Caustic soda, or equivalent, is employed in reaction with the granular, flaked or feather zinc to produce the nascent hydrogen.

The proportional parts of nitrobenzol and the reacting agents may be ascertained by the following example:

123 lbs. nitrobenzol,
200 lbs. zinc granules, flakes or feathers,
50¾ lbs. caustic soda,
with about 300 lbs. of water.

In carrying out my invention, the full zinc content is charged with the remainder of the charge into a suitable reducer and subjected to thorough agitation. Preferably, the reducer is constructed in accordance with the features disclosed in my co-pending application Serial Number 236,512, filed May 25, 1918, entitled Chemical apparatus, and comprising a rotatable drum, mounted on suitable bearings, and provided interiorly with spaced shelves disposed radially on the inner surface of the drum and open-faced spaced agitation members extending between the shelves and the axis of the drum and staggered relatively to one another.

The proper quantity of water is first charged in the charging opening of the drum, then the caustic soda is added, then the nitrobenzol and finally the full content of the zinc in granular, flake or feather form. Preferably, the zinc particles are equally distributed on the bottom face of the drum.

The closure of the charging opening is then sealed and the drum rotated under suitable power from 15 to 20 revolutions per minute, until the reaction has been completed, covering a period of from fourteen to eighteen hours.

The resulting evolution of the nascent hydrogen generates its own reaction temperature, approximately a maximum of 98° C.

Preferably, the drum is enclosed with an asbestos coating to minimize the dissipation of the evolved heat. The drum and its mounting means are preferably also enclosed in a wooden housing or similar structure of heat-insulating material.

The termination stage of the reaction is indicated by a fall in temperature, of say below 50° C., shown by a pyrometer indicator card, or equivalent.

Upon sealing the closure after charging and rotating the drum, no attention whatsoever is required; mere inspection of the temperature indicator will indicate when the final stage has been reached.

The evolved gases are discharged through a suitable piping, extending through a trunnion of the drum.

My invention obviates the necessity obtaining in heretofore proposed methods of continuously supplying the zinc in the form of dust by an operator throughout the period of the reaction, resulting in a high proportion of loss of the zinc dust and loss in heat energy.

The invention is highly advantageous in making possible the use of the cheaper forms of zinc metal.

My invention is especially beneficial to mankind in avoiding the impairment of health and serious sickness, often resulting in death, due to the dissemination of the zinc dust in the atmosphere.

Further advantages of my invention reside in effecting a uniform distribution of the zinc, with attendant uniform liberation of the nascent hydrogen; also in obviating the need of steam or other endothermic means.

The hydrazobenzol is separated from the accompanying reaction products of the discharged mass in the usual manner, and benzidine derived from the hydrazobenzol in any approved method. Tolidine and other homologues of benzidine are derived in a similar manner, as will be understood.

The yield of the desired benzidine or its homologues, in accordance with my invention, exceeds eighty per cent.

As set forth above the zinc or equivalent is charged in the form of granules, flakes or feathers and in the claims I have employed the expression "zinc in the form of individual particles each having a relatively large mass and a relatively small surface area" to define the same from zinc in the form of dust.

Whereas I have described my invention by reference to specific ingredients and proportional parts thereof, it will be understood that the same may be varied or modified without departing from the invention as defined by the appended claims.

I claim.

1. The method of deriving hydrazobenzol, comprising subjecting an aqueous mixture of nitrobenzol and caustic soda to the action of zinc in the form of particles having a large mass and a small surface area as compared with filings, the full charge of nitrobenzol, caustic soda, and zinc being located at one time and discharging the evolved gases.

2. The method of deriving hydrazobenzol, comprising charging a mixture of water, nitrobenzol, caustic soda and the entire required amount of zinc in the form of particles, each particle being of large mass and having a small surface area as compared with filings and discharging the evolved gases.

In testimony whereof I have signed this specification this 23rd day of May 1918.

WILLIAM H. MAHLER.